United States Patent Office 3,509,760
Patented May 5, 1970

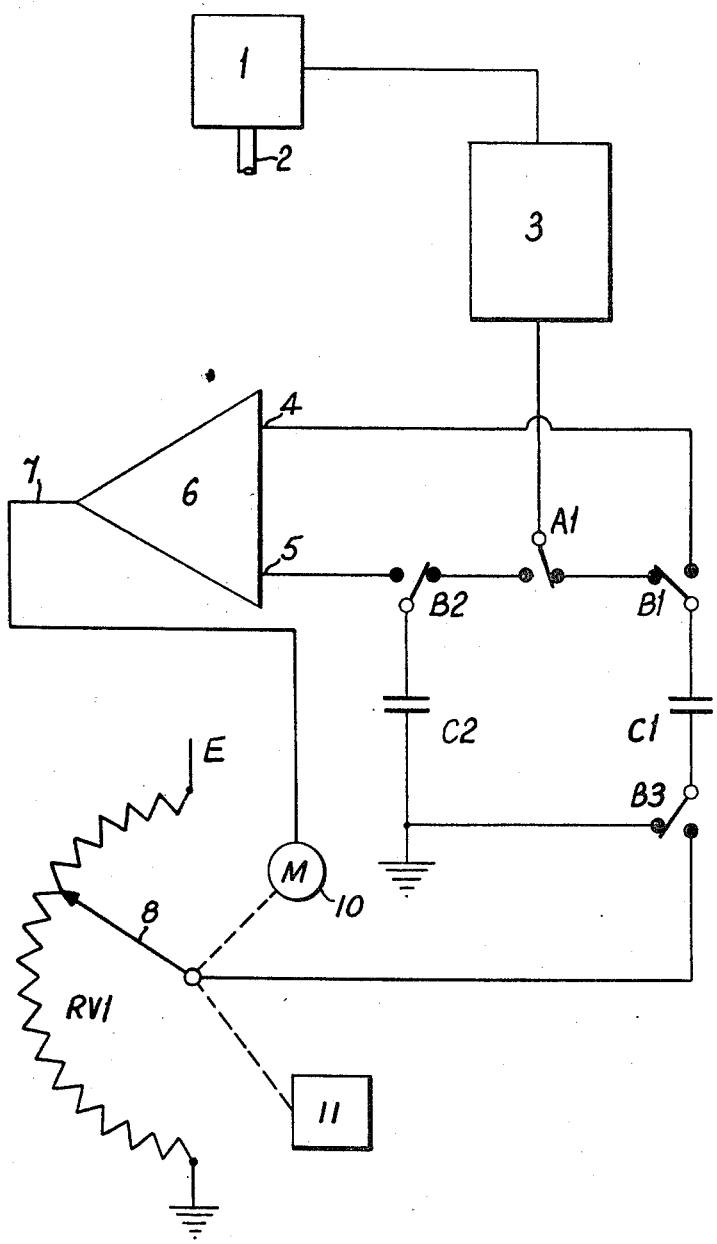

3,509,760
APPARATUS FOR THE MEASUREMENT OF LOADS
Bernard Stuart Baker, Coventry, England, assignor to Courtaulds Limited, London, England, a British company
Filed July 21, 1967, Ser. No. 655,012
Claims priority, application Great Britain, Aug. 5, 1966, 35,109/66
Int. Cl. G01l 1/08
U.S. Cl. 73—88       7 Claims

ABSTRACT OF THE DISCLOSURE

Apparatus for measuring a change in load comprises an electrical circuit embodying a comparison device for indicating the voltage difference between a first voltage produced by an electrical device sensitive to the first load and a second voltage produced by an electrical device sensitive to the changed load. Preferably capacitors are employed to store charges representing the first and second voltages and a variable voltage is added to the smaller until the comparison device indicates balance has been reached. The value of the variable voltage at balance indicates the desired difference between the first and second voltages.

This invention relates to apparatus for the measurement of loads and in particular to the comparison of measurements of loads to determine their difference. The invention is applicable, for example, to the measurement of the mass of articles on balances and to the determination of the tensile properties of articles, particularly the tensile properties of textiles or other elongated elements such as yarn, threads, filaments, wire and the like, hereinafter referred to collectively as filaments.

The measurement of the load on a balance or other load measuring apparatus commonly requires the subtraction by the operator of an initial load from an increased load on the apparatus to determine the change in the load.

The present invention enables comparison of loads to be made automatically thereby avoiding the necessity of either zeroing the load measuring apparatus before each measurement or subtraction by the operator of loaded and unloaded measurements.

According to this invention, an apparatus for the measurement of a change in load comprises a device for producing a first voltage proportional to the initial load, a device for producing a second voltage proportional to the changed load and means for automatically comparing the first and the second voltages to give an indication of the voltage difference between them.

The device for producing the first voltage is preferably the same as the dveice for producing the second voltage. The device is preferably a "load cell." Various types of proprietary load cell are available. Some operate without any significant movement of the part of the load cell to which the load is applied; these are commonly termed stiff load cells. Other types of load cell operate with appreciable movement of the part to which the load is applied, usually against the restraining influence of a spring. An example of the latter is constructed like a spring balance with a potentiometer wiper moving with the pointer and arranged to move along the potentiometer track as the load is applied to the balance.

The comparison between the first and second voltages may be accomplished by storing the first and second voltages on capacitors and then applying the stored charges to an electrical comparator circuit. To the first voltage applied to the comparator circuit a third voltage is added which is increased progressively until the point when the second voltage equals the sum of the first and third voltages. This point is indicated by a signal produced at the output of the comparator circuit. The third voltage at the indicated point is equal to the difference between the first and second voltages and therefore is proportional to the change in the load.

The determination of the tensile properties of a filament is generally performed on apparatus in which the filament is clamped between two clamps one of which is fixed to a load cell and the other of which is movable to tension and elongate the filament. On movement of the free clamp, the filament elongates because of the load applied thereto which is measured by the load cell. The determination of the load necessary to break the filament or to extend the filament by any given amount may be accomplished automatically on apparatus embodying this invention by substracting the initial load on the apparatus, due to the mass of the filament and the clamps etc., from the load exerted at the appropriate elongation of the filament up to the instant of breakage of the filament.

An embodiment of the invention is illustrated, by way of example, by the accompanying drawing which is a block circuit diagram of parts of an apparatus for determining the physical properties of filaments.

The apparatus comprises a load cell 1, having a load applying arm 2, which is connected to an element(not shown) upon which loads are to be measured, for example the clamp of a tensile testing apparatus of the type described above. The output line of the load cell is connected through a uni-directional, unity-gain buffer amplifier 3, having a very high input impedance (e.g. an input resistance of not less than $10^{12}$ ohms), to the switch arm of a two-way switch A1, and according to the position of this switch the potential of the load cell can be applied respectively to one contact of either of two further two-way switches B1 and B2. The other contacts of these switches are connected respectively to input terminals 4 and 5 of a voltage comparator unit 6 arranged to give a signal at its output line 7 when the potentials applied to its terminals 4 and 5 are equal. The input impedance of the comparator unit 6 should be as high as possible, so that it does not degrade its input supplies, and an input resistance in excess of $10^{10}$ ohms is considered desirable.

The switch arms of the switches B1 and B2 are connected respectively to low leakage, high grade capacitors C1 and C2 so that by suitable positioning of the switches and of switch A1, the potential of the load cell can be supplied to either of the capacitors. The other end of the capacitor C1 is connected to the switch arm of a further two-way switch B3, the contacts of which are connected respectively to earth and to the wiper 8 of a potentiometer RV1 across which is applied a voltage E. The other end of capacitor C2 is earthed.

The switches A1, B1, B2 and B3 should have as low a leakage current as possible. Hermetically sealed relays are preferred where highest accuracy is desired.

With the switches in the positions shown it will be seen that a potential equal to the output voltage of the load cell 1 is supplied to the capacitor C1, which will be charged to this potential. By reversing switch A1 the capacitor C2 can be charged to the output potential of the load cell 1. After charging the capacitors, their potentials can be applied to the terminals 4 and 5 of the comparator unit 6 by reversing the switches B1 and B2. By reversing also switch B3 the potential of the wiper arm 8 can be added to that of the capacitor C1, and the comparator unit 6 can compare the potential of the capacitors C2 with the sum of the potentials of the capacitor C1 and the wiper 8.

The wiper 8 at the start of a measurement is set at the earthed end of the potentiometer RV1, and after charging the capacitors, and reversing the switches B1, B2 and B3 as described, it is moved towards the other end of the potentiometer. When the potentials applied to the comparator unit are equal a signal will be given on the line 7, and the potential of the wiper 8 will then be equal to the difference between the potentials of the capacitors C1 and C2. The wiper 8 may be arranged to move a pointer over a scale so as to give a direct indication of its potential, and also is preferably driven by a motor 10 which is switched on simultaneously with the reversing of the switch B3, and switched off by the signal on the output line 7 of the comparator unit.

In use the switches are set in the positions shown until the initial load has been applied to the filament, and sufficient time has been allowed for the capacitor C1 to be charged to the potential of the load cell 1 under the initial load. The switch A1 is then reversed and further load applied to the filament whereupon the capacitor C2 is charged to the new potential of the load cell 1. In the particular application described the further load may correspond to a predetermined degree of extension of the filament under test, or to breakage of the filament.

Switches B1, B2 and B3 are then reversed, and the wiper 8 moved along the potentiometer RV1 until a signal is given by the comparator unit 6 whereupon the position of the wiper 8 gives an indication of the difference between the initial and final potentials of the load cell 1 and consequently of the load change.

The wiper 8 may be connected to a recording instrument 15 actuated to record its position by the signal from the comparator unit, so that the apparatus is wholly automatic. The recording instrument 11 can of course be calibrated directly in terms of load.

Apparatus embodying the present invention for determining the breaking load on a filament, may advantageously be used in conjunction with apparatus described in the specification of our copending patent application No. 655,018 of even date which can be used to apply small loads to filaments to remove any crimps they may have and so enable their "original" lengths to be measured, an operation known as "pretensioning," and with apparatus described in the specification of our copending patent application No. 655,011 of even date which can be used to determine the percentage extension of filaments during their tensile testing.

I claim:
1. Apparatus for the measurement of a change in load comprising a device for producing a first voltage proportional to the initial load, a device for producing a second voltage proportional to the changed load, a voltage storage means electrically connected to be charged to the first voltage, a device for producing a variable voltage output, a comparator circuit one of whose inputs can be switched to adopt the second voltage and the other of whose inputs can be switched to adopt the summed potential of the voltage storage means and the said voltage output device and means for indicating the difference in said first and second voltages.

2. Apparatus as claimed in claim 1, in which the device for producing the first voltage is the same as the device for producing the second voltage.

3. Apparatus as claimed in claim 2, in which said device is a load cell feeding its output via a buffer amplifier.

4. Apparatus for the measurement of a change in load comprising a device for producing a first voltage proportional to the initial load, a device for producing a second voltage proportional to the changed load, a first capacitor electrically connected to be charged to the first voltage, a second capacitor electrically connected to be charged to the second voltage, a device for producing a variable voltage output, a comparator circuit one of whose inputs can be switched to adopt the summed potential of the first capacitor and the said voltage output device and means for indicating the difference in said first and second voltages.

5. Apparatus as claimed in claim 4, in which the output of the potentiometer increases automatically until the two potentials applied to the inputs of the comparator circuit are equal.

6. Apparatus as claimed in claim 4, in which the device for producing a variable voltage output is a potentiometer.

7. Apparatus as claimed in claim 4, in which the device for producing the first voltage is the same as the device for producing the second voltage.

References Cited

UNITED STATES PATENTS 2,766,981  10/1956  Lauler et al. _____ 265—70

JERRY W. MYRACLE, Primary Examiner

U.S. Cl. X.R.

324—100

UNITED STATES PATENT OFFICE
CERTIFICATE OF CORRECTION

Patent No. 3,509,760                    Dated May 5, 1970

Inventor(s) Bernard Stuart Baker

It is certified that error appears in the above-identified patent and that said Letters Patent are hereby corrected as shown below:

Col. 1, line 57  change "dveice" to --device--;
Col. 3, line 34  change "15" to -- 11 --;
Col. 4, line 26  after "inputs" insert -- can be switched to adopt the potential of the second capacitor and the second of whose inputs -- .

SIGNED AND SEALED
NOV 24 1970

(SEAL)
Attest:

Edward M. Fletcher, Jr.
Attesting Officer

WILLIAM E. SCHUYLER, JR.
Commissioner of Patents